United States Patent

Simon et al.

Patent Number: 5,430,612
Date of Patent: Jul. 4, 1995

[54] COMBINATION INSTRUMENT WITH SYSTEM SUPPORT FOR HOLDING DISPALY COMPONENTS

[75] Inventors: Ernst-Ulrich Simon, Oberursel; Stephan Zech, Eltville; Josef Langhammer, Karben, all of Germany

[73] Assignee: VDO Adolf Schindling AG, Frankfurt am Main, Germany

[21] Appl. No.: 139,945

[22] Filed: Oct. 20, 1993

[30] Foreign Application Priority Data

Dec. 2, 1992 [DE] Germany .......... 42 40 457.6
May 6, 1993 [DE] Germany .......... 43 15 027.6

[51] Int. Cl.⁶ .................................... H05K 5/00
[52] U.S. Cl. ............................ 361/752; 361/761; 361/792; 361/800; 361/807; 174/17 R; 174/35 R; 174/255; 248/27.1
[58] Field of Search ......... 361/748, 752, 761, 792, 361/796, 800, 807, 809, 816; 174/260, 255, 17 R, 35 R; 248/27.1; 73/866.3; 362/61; 307/10.1

[56] References Cited

U.S. PATENT DOCUMENTS 5,099,396 3/1992 Barz et al. .......................... 361/424

Primary Examiner—Leo P. Picard
Assistant Examiner—Young Whang
Attorney, Agent, or Firm—Martin A. Farber

[57] ABSTRACT

A combination instrument having a front frame (12), a transparent cover glass (16), display systems (2) and/or operating elements mounted in the combination instrument, a circuit board (6) arranged behind them and bearing electronic components, the display systems and/or operating elements contacting the circuit board, and having a rear closure cover (13) for the combination instrument. Such a combination instrument is particularly easy to construct and mount and can thus be produced at favorable cost when it has a system support (1) developed as supporting structural part provided with recesses for the positioning and holding of the display systems and/or operating elements. The circuit board is connected to the system support. The system support thus represents the supporting element of the combination instrument around which all other parts of the combination instrument are grouped.

34 Claims, 11 Drawing Sheets

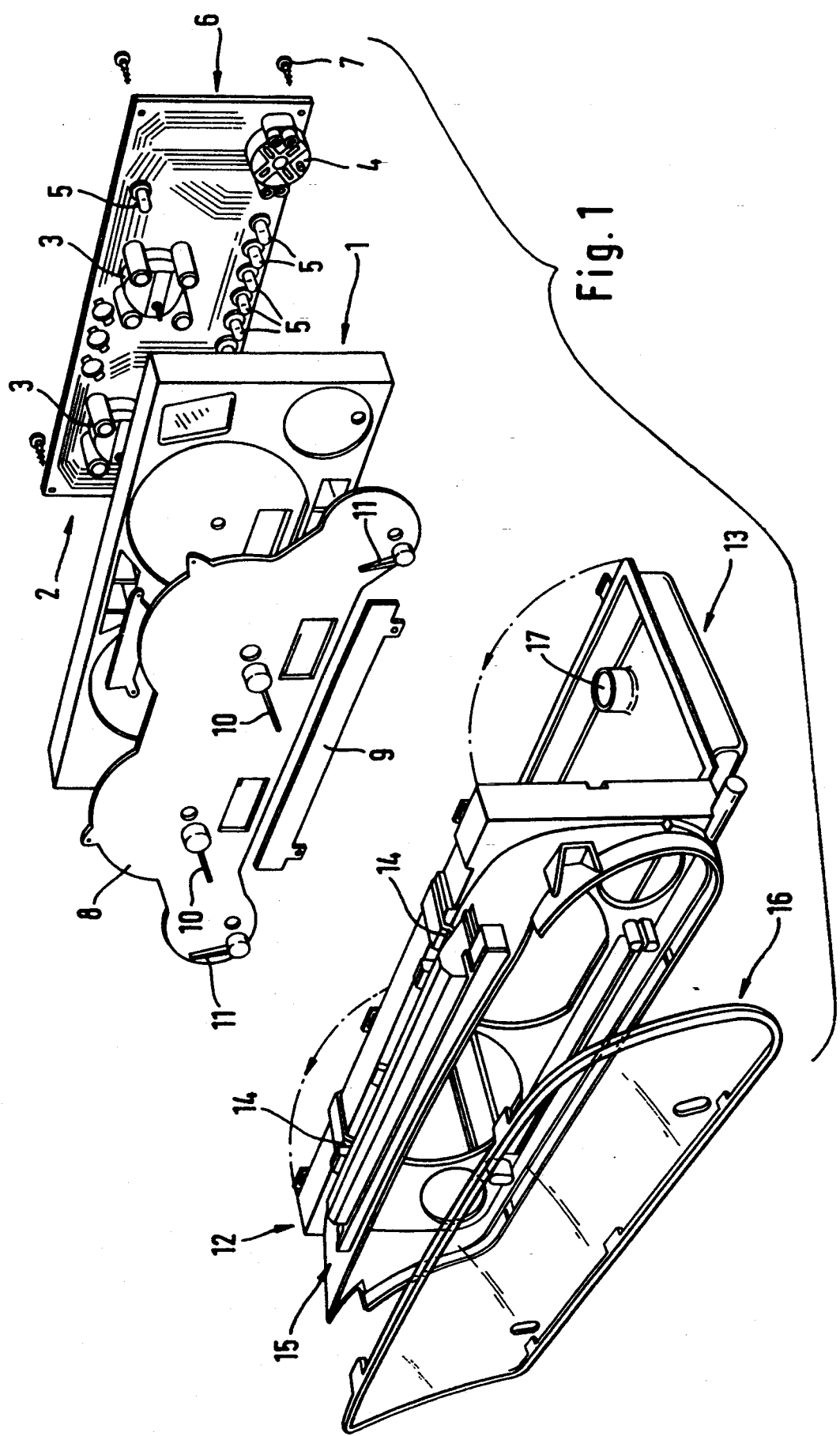

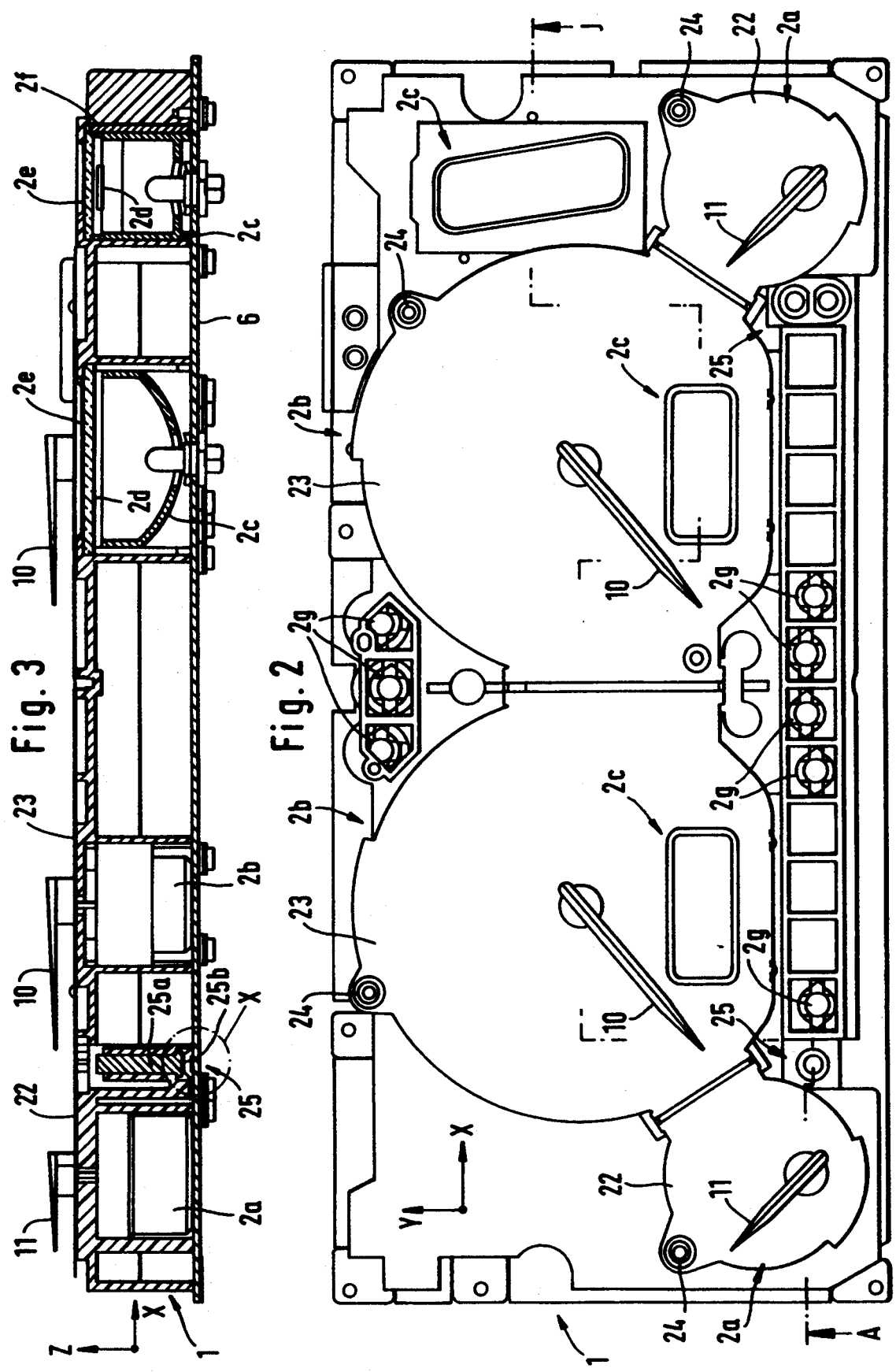

COMBINATION INSTRUMENT WITH SYSTEM SUPPORT FOR HOLDING DISPALY COMPONENTS

FIELD AND BACKGROUND OF THE INVENTION

The present invention relates to a combination instrument having a front frame (for instance 12), a transparent cover glass (16) for the front frame (12), display systems (2) and/or operating elements (25) mounted in the combination instrument, a circuit board (6) having electronic components which is arranged behind the display systems (2) and/or operating elements (25), the display systems and/or operating elements contacting the circuit board (6), and having a rear closure cover (13) for the combination instrument.

Such a combination instrument is used, in particular, in vehicles, particularly in motor vehicles.

The combination instruments of the above-indicated type are essentially of modular construction. The modules are received by base plates, the front frame, the closure cover or similar parts. In particular, instruments are known in which the front frame as supporting part represents the connection to the instrument panel, it being necessary for the front frame to be of great stiffness. The strength required for the front frame substantially determines its shape, by which the visual appearance of the front view of the combination instrument is substantially determined. Furthermore, the stiffness required of the front frame does not permit a free selection of its material, so that materials favorable for an optimal visual appearance of the front region of the combination instrument cannot be used. Since, in addition to the front frame, the base plates and the closure cover or similar parts must also receive the modules, these parts must be of such a strength that they can assume a supporting function. Aside from this, the mounting of the modules in different structural parts results in the construction of the combination instrument being complicated, and in a high expense being required for mounting.

SUMMARY OF THE INVENTION

It is an object of the present invention so further to develop a combination instrument of the type indicated above that it be particularly simple to construct and mount, so as to be produced at favorable cost.

According to the invention, a combination instrument of the foregoing type has a system support (1), developed as supporting structural part, which is provided with recesses (21) for the positioning and holding of the display systems (2) and/or operating elements (25), the circuit board (6) being attached to the system support (1).

The essential feature of the instrument in accordance with the invention provides that the known modular construction is replaced by a system support having additional functions. Such a structural part permits great freedom in development, so that, for instance, no further support elements are required for the construction of the combination. The system support is thus the supporting element of the combination instrument. In this way, the possibility is provided of reducing the number of individual parts, possibly of different materials. All individual parts and assemblies can be added to the system support upon the final installation. In this way, a simplicity of types results. With this concept, the module premounting which was previously necessary is done away with. All adjustment and testing procedures can be carried out on the functional unit thus produced. The testing of the individual modules is dispensed with so that the number of tests is considerably reduced. The system support furthermore permits the use of individual dials and of dials which are attached to each other. In this way, upon the use of dials which are attached to each other, incorrect combinations are excluded; this applies also to symbol disks or similar components. The system-support concept finally makes it possible to establish a functional unit. Thus, the requirements for a meaningful line or group mounting are created. The group mounting can be developed with a high work content and responsibility for obtaining the required quality.

As used in this invention, there is understood by the expression "display system" any system which provides a person viewing the combination instrument with information. Each display system (2) can, for instance, comprise a measuring mechanism, in particular a movement (2a) with pointer (10, 11) and dial (23) or symbol disk (22) or a display component (5), in particularly a luminous display. By operating elements there are understood all those components which can be operated from the outside, for instance a button for resetting a trip odometer, a button for calling up or extinguishing information indicated in a display of the combination instrument, etc.

The system support thus combines different functions: It represents the support for all kinds of movements; it can assume the function of a holder and thus of a positioning for LCD's which with guide rubber guidance, and furthermore a guide and mount for the operating elements. Finally, light can be guided by the system support. Thus light guides, particularly for information and warning fields which can be illuminated by different sources of light are possible. Light guides are also conceivable for dials, pointers and the connecting of light in the case of transmitted light illumination. Partial imperviousness to light required for lamp shafts, LCD housings or the like can be obtained by parts made of two materials, in particular parts made with the use of two-color injection molding. For the guidance of the light, the system support is preferably made of plexiglas. Light boxes or, for instance, top lighting can be attached to the system support by a film hinge or several film hinges. The system support furthermore permits the positioning and mounting of the indicating components, for instance the sources of light such as incandescent bulbs, cold cathode tubes, etc., as well as the positioning and fastening of electronic assemblies of different number and size, such as, for instance, of the circuit board and possibly also several circuit boards, and hybrids. In addition, the system support can serve for the positioning and fastening of a one-piece dial, individual dials and masks which are necessary for design considerations, upon top illumination and transillumination, as well as a combination thereof.

In order to make the mounting of the combination instrument particularly easy, the system support (1) is provided on its rear with the recesses (21) for the display systems (2) and operating elements (25).

The recesses (21) are preferably developed as shafts and/or are formed by ribs and/or honeycombs (19, 20) serving to stiffen the system support (1). Due to the basic ribbing or honeycombing of the combination instrument, the latter has a high degree of rigidity, with only slight weight. With a suitable arrangement of the ribs or honeycombs they can act as recesses and, in the event of special shaping, form the shafts.

In accordance with one particular embodiment of the invention, recesses (21) corresponding to the maximum number of display systems (2) and/or operating elements (25) are provided in the system support (1). In this way, a considerable logistic advantage is obtained, since the system support can basically be equipped in line with all possible variants with regard to display systems and/or operating elements, recesses and cutouts in the system support remaining accordingly free in the event of a smaller number of equipment parts. It is furthermore considered advantageous that the recesses (21), or cutouts, insofar as necessary, have cross sections which are characteristic for the display systems (2) and operating elements (25) associated with them. With a corresponding different shape of the display systems and the operating elements, an erroneous mounting of them is then not possible.

The system support (1) preferably extends over the entire visible surface of the combination instrument. It thus has essentially the same height and width as the front frame. The system support (1) can be made of synthetic material and particularly can be formed as a plastic die cast or injection molded part. The front frame (12) and/or the rear closure cover (13) are preferably developed as non-supporting parts which are positioned and held in the system support (1). The attaching of the front frame, by which there is also understood a front-frame assembly to the system support can possibly be effected by the use of fastening parts. Since the front frame and the closure cover can be developed as non-supporting parts, there is the possibility of developing them as thin-walled parts connected to the system support, for instance, by a film hinge. In particular, the closure cover can be formed by extrusion directly on the system support or even be developed as a foil. It is also conceivable for the closure cover to be attached to the front frame, the closure cover and front frame being guided and held in the system support. If the closure cover is provided with cutouts, there is the possibility of replacing electric parts, for instance bulbs/tubes, in the combination instrument without having to open the cover.

One essential feature of the aforementioned invention consists in the mounting of the circuit board in the system support. Thus, a guidance and attachment in connection with the contacting is necessary, on the one hand, for the movements, and indicating display components such as, for instance, LCD operating elements, etc. On the other hand, mechanical stresses which result, for instance, from different temperature coefficients of expansion of the parts used in combination instruments are to be excluded. Thus in one possible embodiment the system support is developed as a rigid frame which, by means of resilient elements, bears movements, dials, operating elements and receivers for other display components in floating manner. Errors in display caused by different coefficients of expansion are in this way eliminated. Furthermore, the prerequisites for an electric contacting which is free of strain are created. If the overall construction of the combination instrument does not require the decoupling described, a rigid embodiment of the system support, for example, may be provided.

In line with the above, fundamental embodiments provide for the circuit board (6) to be mounted in floating manner in the system support (1).

In a preferred embodiment, the display systems (2) and operating elements (25) are mounted in the system support so as to be non-displaceable in a direction perpendicular to the lengthwise direction of the recesses (21), and the circuit board (6) is mounted displaceably in the plane (X, Y) of the circuit board or, the dials, if present, are mounted displaceable relative to the system support (1) in the plane of the dial.

The floating support of the components in the system support, which is not limited to circuit boards and dials, can be obtained, for instance, by pin (26, 27) and slot connections between the components and the system support (1); instead of a pin, it is also possible to use bolts, screws or the like. The attachment of the components to the system support provides assurance that movement of the components perpendicular to the system support is not possible. With a floating mounting of the circuit board in the system support, assurance is furthermore had that the contacting of display systems (2) and/or operating elements (25) to the circuit board is effected in floating manner. This can take place in the manner that the point of contact in the region of the circuit board is displaceable in the direction of the plane of the circuit board.

According to a feature of the invention, in order to receive the circuit board (6) and/or a dial (8), the system support (1) has pins (26, 27) which extend through slots (26a, 27a) in the circuit board (6) and/or the dial (8), a slot (27a) which is arranged in the central region of the circuit board (6) and/or dial (8) extending in the width-wise direction (Y) of the circuit board (6) and/or dial (8) and at least one slot (26a) arranged outside the central region, extending in the longitudinal direction (X) of the circuit board (6) and the dial (8).

Further features of the invention provide that two slots (26a) extending in the longitudinal direction (X) of the circuit board (6) and of the dial (8) are provided, arranged in the region of the two narrow sides of the circuit board (6) and dial (8).

Another feature of the invention is that the attachment of the circuit board (6) and/or of the dial (8) is effected via screws (67) or rivets which pass through the slots (26a, 27a, 55) of the circuit board (6) and the dial (8).

In the final result, this means that when a system support, for instance a rigid system support, is used in a combination instrument a corresponding adjustment is created for the components with different coefficients of expansion which are mounted on the system support. The slots are so arranged in this connection that, with counteracting of the manufacturing tolerances, an accurate positioning is assured. This accurate positioning is assured even in the case of different longitudinal temperature expansions of the individual components. This result is obtained, in particular, in the manner that the slots of the x and y axes are arranged at a right angle. The slot extending in the y axis is in this connection arranged substantially in the center of the corresponding component. If the pins are part of the system support and are produced by extrusion, for instance, on its top and bottom sides, a particularly great precision in positioning, particularly of the circuit board with respect to the dial, can be obtained. The fastening of the components on the system support can be effected, for instance, by means of screws of various type, possibly with washer embossed thereon, or via rivets produced by extrusion on the system support. The fastening of the components to the system support is effected in this connection, regardless of the manner of fastening selected, via slots in the components to be fastened. They are advantageously so arranged that the display system to be attached and the operating element to be attached can slide in the slots upon a change in length of the components with respect to each other as a result of the temperature.

This is achieved, in particular, in the manner that, for the fastening of the circuit board (6), the dial (8) and the further display system (2) and/or operating elements (25) on the circuit board (6) additional slots (55) are provided in the circuit board (6) and the dial (8), the longitudinal direction of the slots (55) corresponding to a straight line from a zero point (56) of the circuit board (6) or dial (8) to the center of the corresponding slot (55). The zero point is the point of intersection of the longitudinal axis of the slots used for the positioning of the components.

A feature of the invention is that the zero point (56) is the center of the slot (27a) oriented in transverse direction (Y) which is arranged in the central region.

Another preferred embodiment proceeds therefrom that the circuit board (6) and those display systems (2, 2a, 2b, 2c) which must be displaceable in order to compensate for stresses, are mounted in the system support displaceable perpendicular to the lengthwise direction of the recesses (21). This can be effected, in particular, in the manner that the displaceable circuit board and the displaceable display systems (2, 2a–2c) are held in recesses (21), the parts of the system support which have the recesses (21) being held in a base plate (18) of the system-support frame via webs (29, 35) which are resilient perpendicular to the lengthwise direction of a recess (21).

According to another feature of the invention, the closure cover (13) is mounted in the system support (1) or is connected to the front frame (12).

Still according to a further feature of the invention, the closure cover (13) is provided with cutouts (17).

The invention also provides that the combination instrument is fastened, in the region of its center of gravity, in an instrument panel of a motor vehicle.

As described above, it is not necessary for the front frame and the closure cover to have a supporting function. This is in particular important for the front frame, which is thus developed substantially without consideration of its material and can thus be produced substantially cheaper and more favorably from a visual standpoint. This applies also to the transparent covering which, as a general rule, is developed as a cover glass. In known combination instruments it is necessary that the cover glass also contribute to the stability in shape of the combination instrument. Since a supporting function is not necessary in this case for the cover glass, it can also be substantially freely shaped, with respect also to its material.

In view of the non-supporting function of most of the structural parts used in the combination instrument and the possibility of being able to select their material substantially as desired, simplified concepts can be developed which permit a favorable recyclability of the combination instrument. Finally, the fact that the system support represents the supporting element of the combination instrument makes it possible to place the center of gravity of the combination instrument in the system support. This, in its turn, makes it possible to fasten the combination instrument by means of the system support (1) on an instrument panel of a motor vehicle and nevertheless have assurance that the attachment lies at the center of gravity of the combination instrument.

BRIEF DESCRIPTION OF THE DRAWINGS

With the above and other objects and advantages in view, the present invention will be become more clearly understood in connection with the detailed description of preferred embodiments which considered with the accompanying drawings, of which:

FIG. 1 shows a development, in principle and in exploded view, of the combination instrument of the invention;

FIG. 2 shows a first embodiment of the system support used in the combination instrument, shown with the system support provided with its equipment, seen in a front view of the system support;

FIG. 3 is a section along the line A–J of FIG. 2;

DETAILED DESCRIPTION OF THE PREFERRED EMBODIMENT

Figure 4:
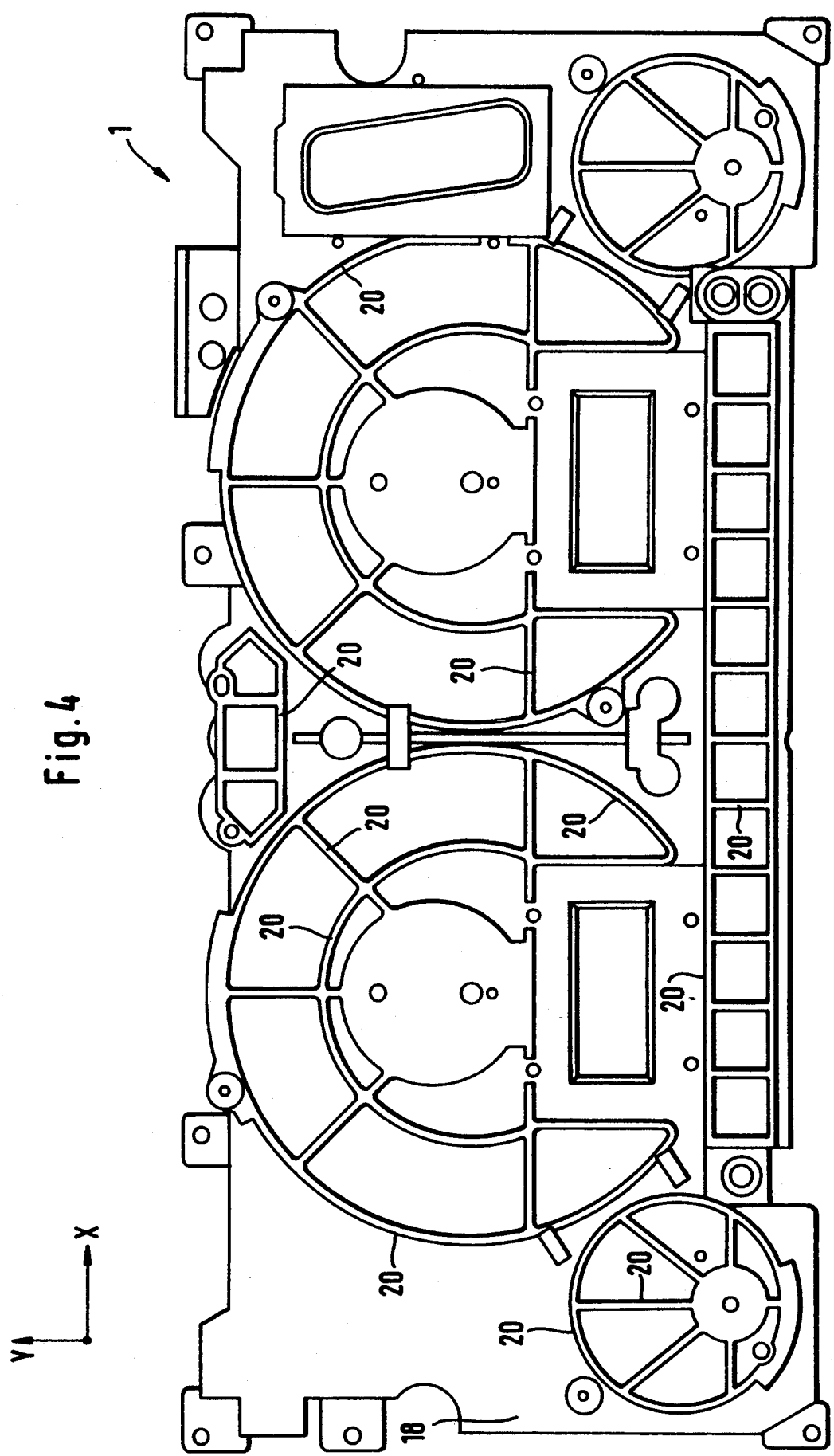
FIG. 4 is a front view of the unequipped system support.

The combination instrument shown in an exploded view in FIG. 1 has, first of all, a system support 1. The latter is provided on its rear (not visible) with a number of cutouts for display systems and operating elements. In the drawing, only display systems 2 in the form of movements 3 and 4 as well as indicating components 5 operating with light display are visible. Further operating elements of the display systems 2, such as, for instance, tape drives, LCDs, individual parts for them, such as guide rubber, dispersion and colored glasses, light-guidance parts as well as switch pads and buttons in connection with the operating parts are not shown. The display systems and operating parts are inserted from the rear into the cutouts in the system support 1, whereupon a circuit board 6 is placed on the system support 1 and the display systems 2 and attached to it by screws 7. A one-piece dial 8 and possibly a mask 9 are placed on the front of the support system 1 and fastened to it, the fastening being effected, for instance, by the riveting of receiving bolts (not shown in detail) for the dial 8 and the mask 9. Symbol disks can furthermore be placed on the front of the system support 1 and connected to it.

Pointers 10 and 11 are then placed on the movements 3 and 4. The unit formed in this manner is then inserted into the front frame 12, to which it is attached by a film hinge (not shown) of the closure cover 13. A light box 15 for top-lit illumination is attached by film hinges 14 to the front frame 12, the contacting of the sources of light of the light box 15 being effected by means (not shown) which are connected with the circuit board 6. The front frame 12 is closed off by a cover glass 16 which can be clipped into the front frame 12. After the system support 1 together with the components connected to it has been fitted to the front frame 2, the closure cover 13 is closed, it engaging with the front frame 12. Cutouts 17 in the closure cover 13 permit accessibility to certain display systems 2 or operating elements. The combination instrument is held, by means not shown in the drawing, in the instrument panel of a motor vehicle, said means engaging directly on the system support 1, preferably at the center of gravity thereof.

Figure 5:
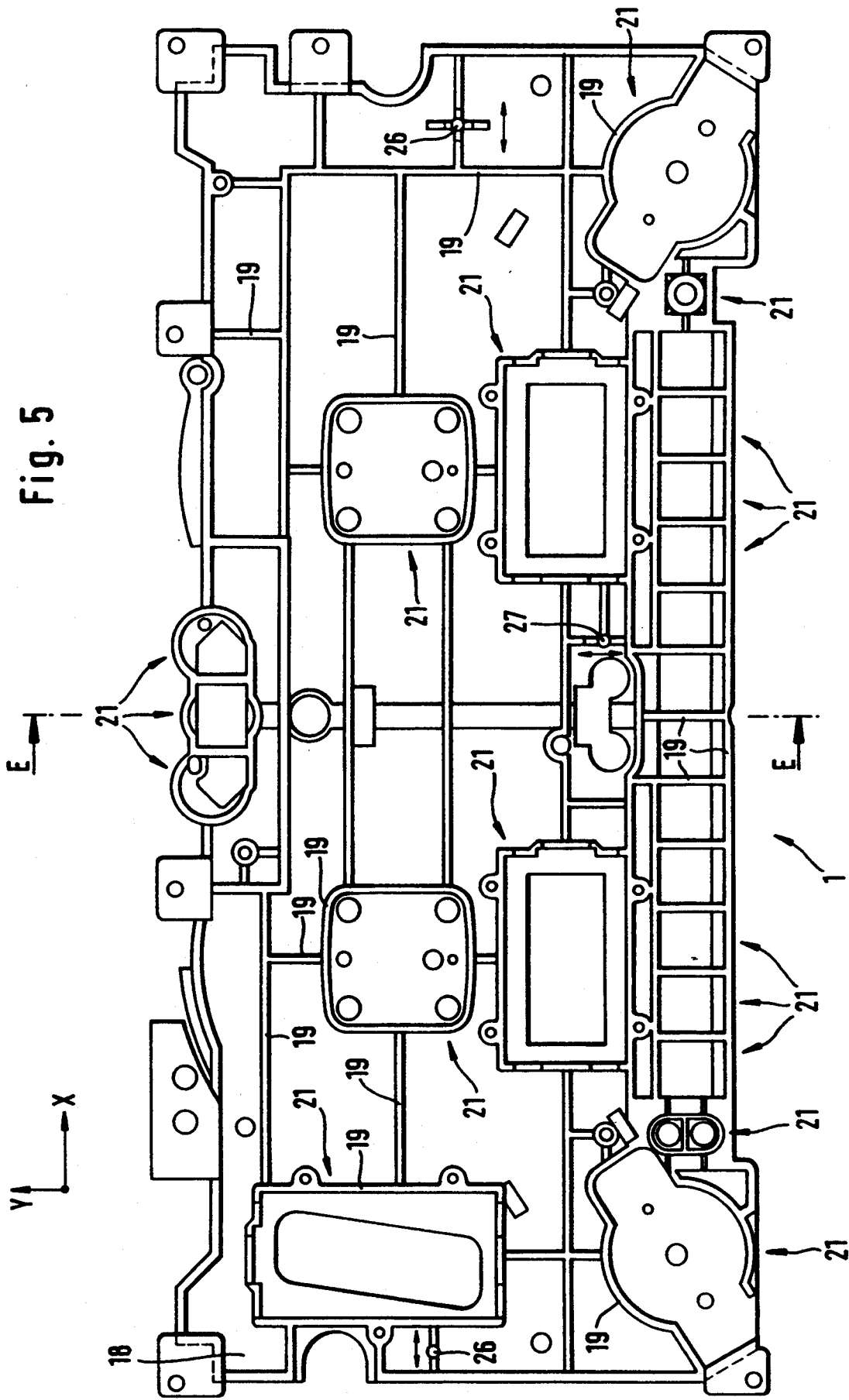
FIG. 5 is a rear view of the unequipped system support.
Figure 6:
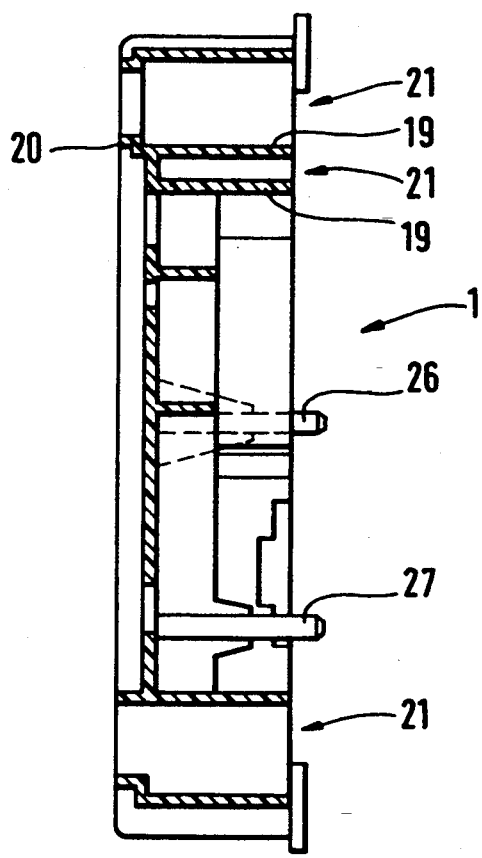
FIG. 6 is a section along the line E—E of FIG. 5.
Figure 7:
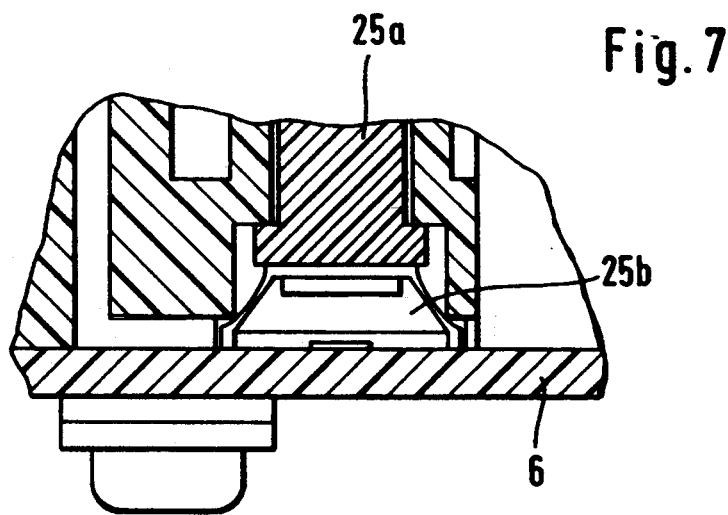
FIG. 7 shows the detail X indicated in FIG. 3.

The development of the first special embodiment of the combination instrument is described below with reference to FIGS. 2 to 7. This embodiment refers to a floating mounting of the circuit board 6. FIGS. 4 and 5 show that the system support 1 consists of a base plate 18 as well as rear ribs or web-shaped stiffenings 19 and front ribs or web-shaped stiffenings 20. Some of these ribs or web-shaped stiffenings have been indicated by the reference numerals 19 and 20 respectively. While the front ribs/web-stiffenings 20 have only a slight length in Z direction (see FIG. 3), the rear ribs and stiffenings 19 have a greater length in Z direction so that selected rear ribs and web stiffenings 19 form shaft-like recesses 21 to receive the display systems and operating elements. FIGS. 2 and 3 show the equipping of the system support 1 with the display systems. Each of the shaft-like recesses 21 on the bottom left and bottom right receives a display system 2 consisting of a rotary-magnet movement 2a. The circular cross section of the corresponding rotary magnet movement 2a is so adapted with respect to the receiving cross section of the associated shaft-like recess 21 that the rotary-magnet movement 2a can be inserted without play in it and thus held dependably therein. One rotary-magnet movement 2a serves, for instance, for displaying the amount of gas in the gas tank, while the other rotary-magnet movement 2a serves to show the temperature of the cooling water of the motor. On the front of the system support 1, corresponding symbol disks 22 are placed around the output shafts of the rotary-magnet movements 2a, and pointers 11 are placed on the output shafts.

In two other shaft-shaped recesses 21 stepping motors 2b are inserted in corresponding manner. One stepping motor 2b serves, for instance, to indicate the speed of travel of the motor vehicle while the other stepping motor 2b serves to indicate the motor rpm. On the front of the system support 1, corresponding dials 23 are placed, the shafts of the stepping motors 2b passing through openings in the dials 23, and pointers 10 being placed on the shafts. From FIG. 2, in particular, it can be noted that the symbol disks 22 and dials 23 represent a single structural unit. This unit is attached by the peening over of pins 24 which pass through the cutouts in the unit. Three other shaft-like recesses 21 serve to receive display systems which have light boxes which have colored/diffusion glasses 2d and LCDs 2e in front of them, the LCDs 2e contacting the circuit board 6 via guide rubbers. The display system above the right rotary-magnet movement 2a serves for instance to indicate the gear-shaped shaft-like recesses 21 to receive display systems in the form of sources of light 2g, for instance cold-cathode tubes. They extend freely into the corresponding recesses 21, i.e. displaceable in X-Y direction. Finally, operating elements 25 in the form of buttons 25a are mounted in the system support 1. The corresponding button 25a is displaceably mounted in a shaft-shaped recess 21 of corresponding circular cross section, the button 25a contacting the circuit board 6 view a switch pad 25b (see the detailed showing in FIG. 7). The corresponding button 25a is accessible though sufficiently large openings in the base plate 18 of the system support 1. An operating element 25 can, for instance, serve to reset the trip odometer to the zero position.

From FIG. 2 it can be noted that not all possible shaft-shaped recesses 21 are equipped. This for the reason that the shaft-shaped recesses 21 of the system support 1 determine the maximum number of equipment parts, it being merely necessary to provide the combination instrument with a larger or smaller number of display systems 2 and operating elements 25 based on the specific desires of the customer. Various shaft-shaped recesses 21 thus remain free and are covered by masks on the front.

The floating attachment of the system support 1 to the circuit board 6 and the dial 8 can be explained on basis of the showing of FIGS. 5, 6 and 8 to 10. It is shown therein that the system support 1 is provided, adjacent its narrow sides in the region of the center of its narrow sides, with two pins 26, and furthermore another pin 27 is provided in this distance from the lower longitudinal side in the region of the center of the longitudinal side. The pins 26 and 27 protrude beyond the rear surface of the system support 1 and engage into slots 26a and 27a in the circuit board 6, shown in FIG. 10. The slots 26a in the circuit board 6 which correspond to the pins 26 extend in the lengthwise direction of the circuit board, while the slot 27a in the circuit board which corresponds to the pin 27, extends in the transverse direction of the board. Due to the different thermal coefficients of expansion of the circuit board 6 and the system support 1, a relative movement of system support 1 and circuit board 6 in X and Y directions is thus possible, specifically in X direction in the region of the pins 26 and in Y direction in the region of the pin 27.

Figure 10:
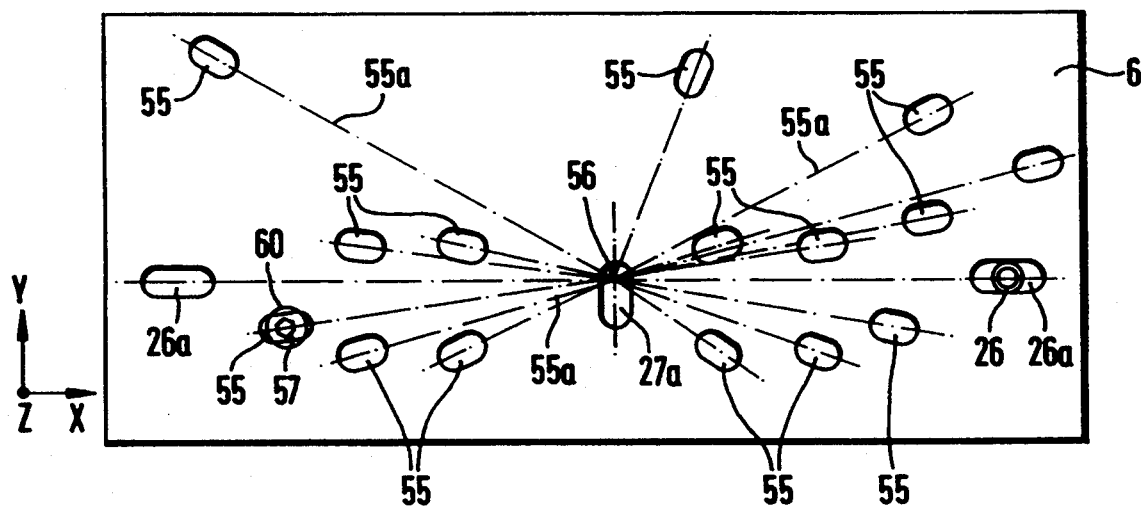
FIG. 10 is a top view of the circuit board shown in FIG. 8.
Figure 12:
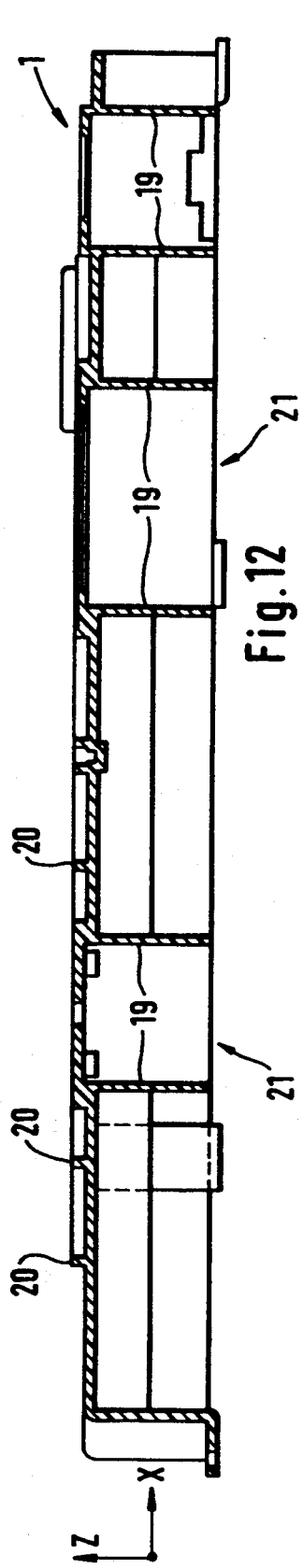
FIG. 12 is a section along the line A—A of FIG. 11.
Figure 11:
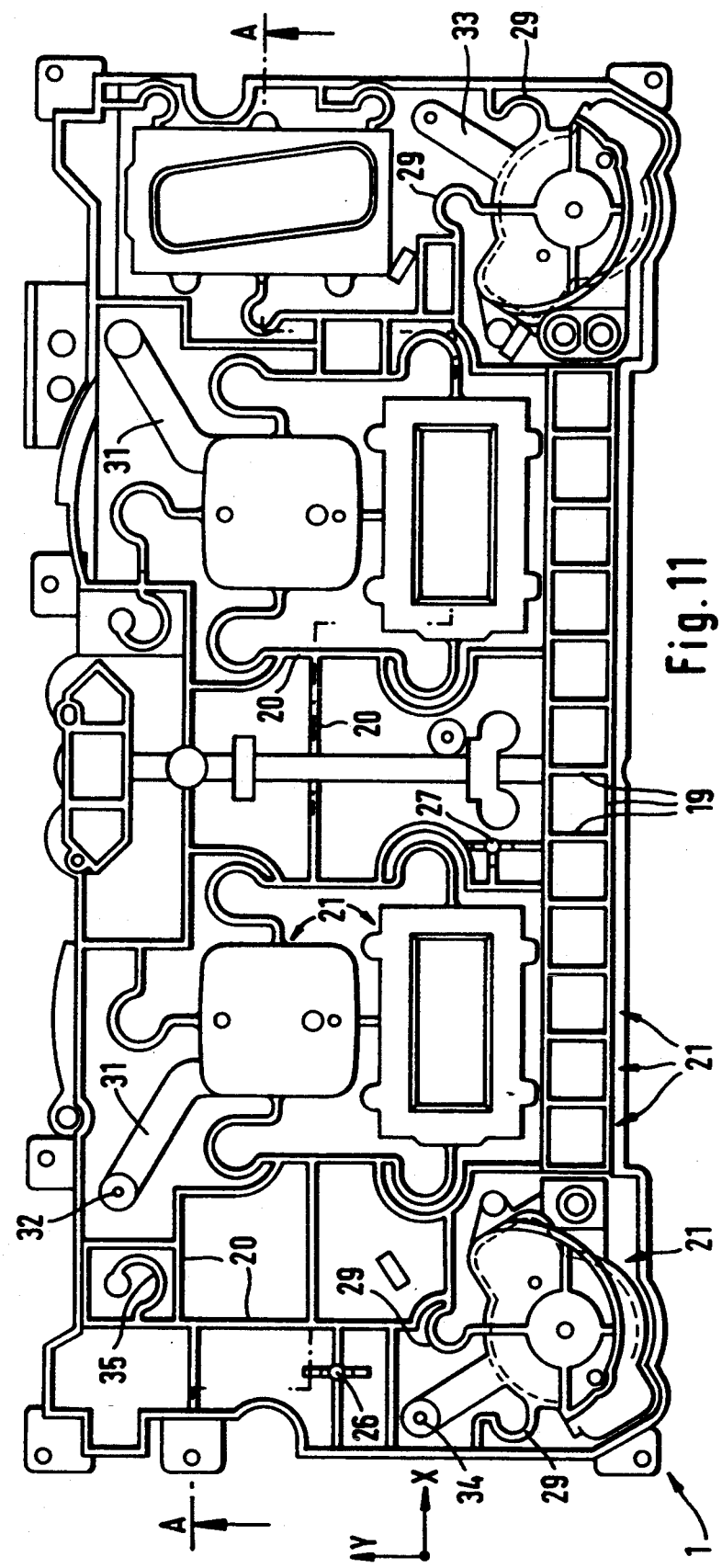
FIG. 11 is a second embodiment of the system support, in unequipped state, seen in a front view.

For the fastening of the circuit board 6 to the system support 1, or for the conductive connecting of the display system movements 3 and 4 and operating elements which are received in the system support 1 and require relative displaceability with respect to the circuit board 6, further slots 55 are provided in the circuit board. These slots are provided in the region of the corresponding display system 2 or operating element 25, the longitudinal axes 55a of the slots intersecting at a zero point 56 which, in the embodiment shown, lies at the intersection of the longitudinal axes of the slots 26a and the longitudinal axis of the slot 27a. The attachment of the circuit board 6 to the system support 1 can be effected, for instance, by screwing or riveting. In FIG. 10, a screw 57 is shown which passes through a slot 55 in the circuit board 6 and is screwed into the system support. The screw head of this screw holds the circuit board in the Z direction shown in FIG. 10, i.e. in a direction perpendicular to the plane of the board, while displacement of the circuit board 6 in the X-Y plane is still possible. Further screws of rivet connections for the fastening of the circuit board 6 to the system support 1 can be provided.

Figure 9:
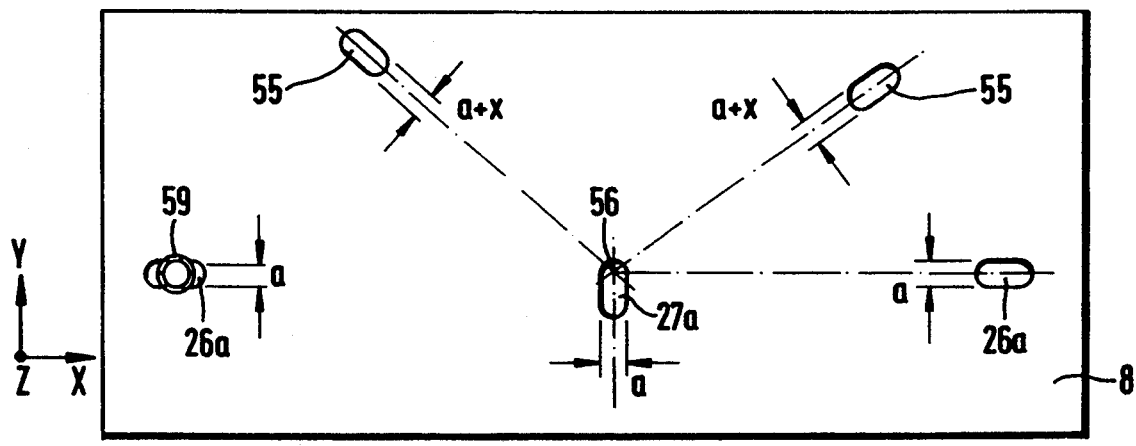
FIG. 9 is a top view of the dial shown in FIG. 8.
Figure 8:
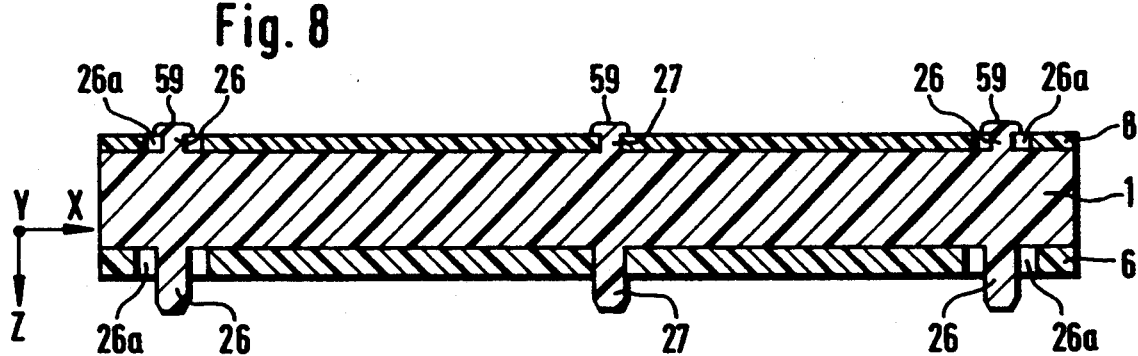
FIG. 8 is a basic showing of a floating attachment of a circuit board and a dial to the system support, shown in a simplified sectional view.

As described above, the circuit board 6 not only serves for the electric contacting of the display systems 2 and the operating elements 25 but it also holds these parts in Z direction. In order that the circuit board 6 be movable relative to the system support 1, all slots have a width which is greater by the possible play for thermal expansion in X and Y directions than the threaded section of the corresponding screw or pin. Washers 60 the outside diameter of which is greater than the width of the corresponding slot are arranged between the circuit board 6 and the screw heads. While the contacting of the movements 3 and 4 takes place by the screws screwed into the metal housing of the movements, the sources of light 2g can be connected directly to the circuit board 6, in which connection a relative movement between the sources of light 2g and the associated shaft-shaped recesses 21 and the light boxes 2c is possible on basis of the diameter or width-depth dimension of the recesses 21 and the light boxes 2c which is greater than the diameter of the source of light 2g. FIG. 9 shows that the compensation for expansion of the dial 8 takes place corresponding to that of the circuit board 6. Thus, the system support 1 on the side facing away from the circuit board 6 has the corresponding pins 26 and 27 which pass through corresponding slots 26a and 27a, the slots 26a being oriented in X direction and the slot 27a in Y direction. By the reference numeral 59, there is shown a cold-peened broadening in the region of a pin 26, i.e. the dial 8 is cold-peened to the system support 1. While the width of the slots 26a and 27a have the value a in accordance with the dimensions of the corresponding slots 26a and 27a of the circuit board 6, the width of the other slots 55 has the value a+x in order to permit for compensation for expansion. The longitudinal axes of these slots 55 in the dial 8 are again so oriented that they intersect at the point 56, i.e. the line of intersection of the longitudinal axes of the slots 26a with the slot 27a in the dial 8.

In the first embodiment described in FIGS. 2 to 7, the display systems 2 are thus mounted rigidly in the system support with respect to rotary-magnet movement 2a, stepping motors 2b and light boxes 2c. In the second embodiment, in accordance with the showing of FIGS. 8 to 12, it is proposed, on the other hand, that the display systems 2 be mounted in the system support 1 movable in X-Y axis with respect to rotary-magnet movement 2a, stepping motor 2b and light box 2c, which also applies to the circuit board 6. Parts agreeing in their development with the first embodiment are designated with the same reference numerals in FIGS. 8 to 12.

The figures show that the shaft-like recesses 21 of the rotary-magnetic movements 2a, the stepping motors 2b, and the light boxes 2c are connected via connecting webs 29 disconnected from the base plate 18 of the system support 1 to the ribs 19 of the system support 1. In this case, the shaft-shaped recess 21 of the corresponding stepping motor 2b is connected via a rigid web 30 with the shaft-shaped recess 21 of the light box 2c arranged below the stepping motor, so that the two shaft-shaped recesses 21 are connected in movement. An extension 31 is furthermore rigidly attached to the shaft-shaped recess 21 of the corresponding stepping motor 2b, the free end of which extension serves as a recess 32 for the positioning or fastening of the dials/symbol disks 23 and 22, developed as a single part. For the same purpose, the shaft-shaped recess 21 of the corresponding rotary-magnet movement 2a is provided with an extension 33 with recess 34 in the region of its free end. The circuit board 6, which is guided as described above in X and Y direction in the pins 26 and 27, is furthermore connected to a connecting web 35 which serves for length equalization and is provided in the region of its free end with a recess 36 for the attachment of the circuit board 6. The connecting web 35 engages on a rear rib 19. For each display system 2 displaceable in the system support 2, two further positioning points 37 each for the circuit board 6 are provided (see FIG. 12). The cutouts 38 shown serve to receive fastening means for the contacting—fastening of the corresponding rotary-magnet movement 2a or stepping motor 2d to the circuit board 6. The cutouts 39 serve for the attachment of the LC displays.

Figure 13:
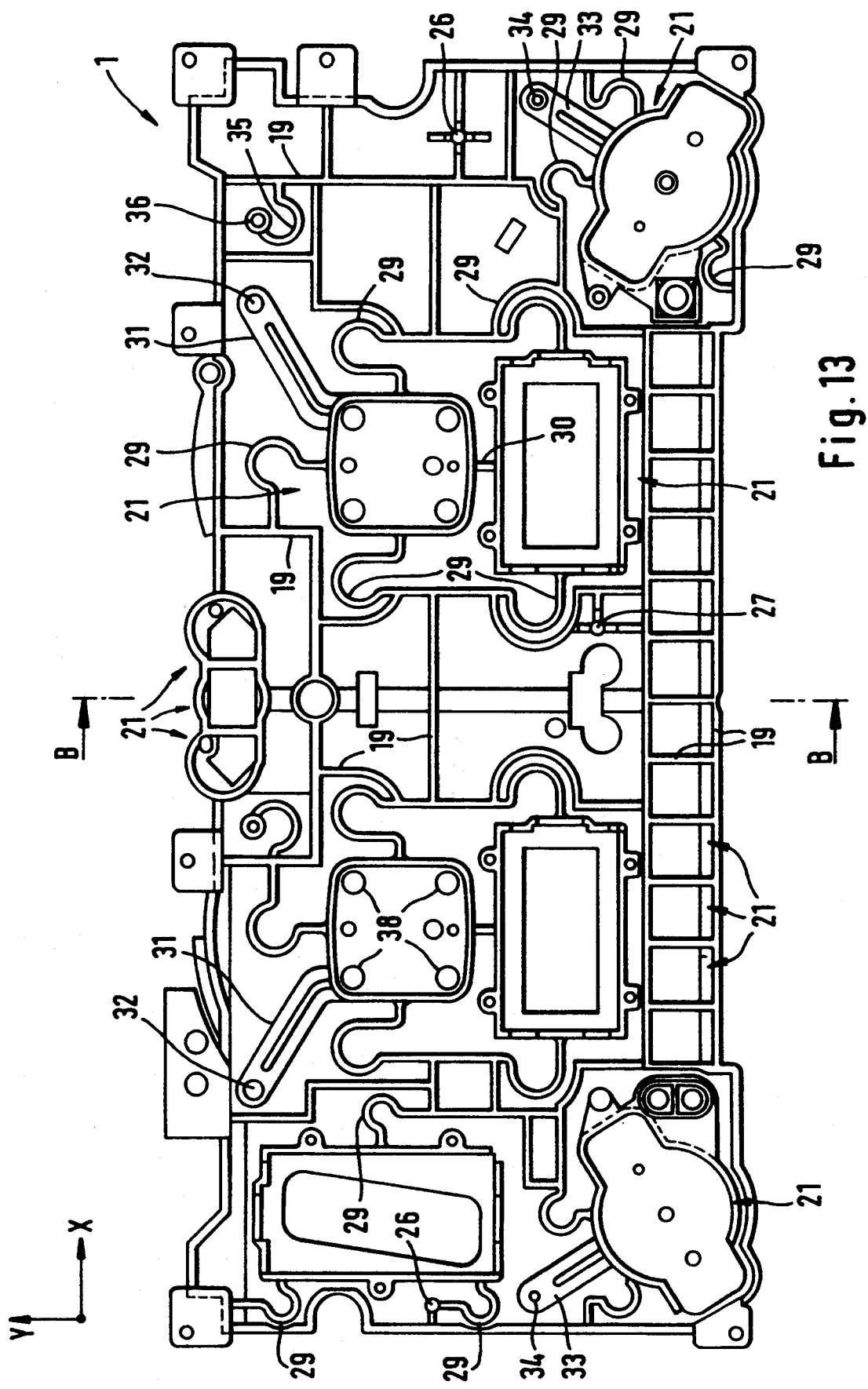
FIG. 13 is a rear view of the system support shown in FIGS. 12 and 13.
Figure 14:
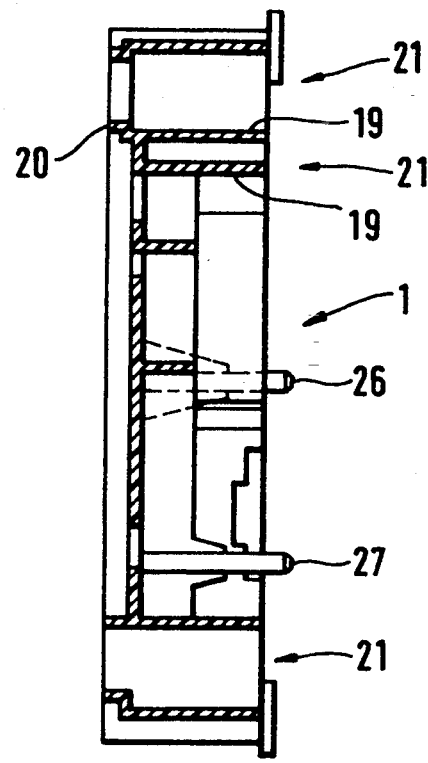
FIG. 14 is a section along the line B—B of FIG. 13.
Figure 15:
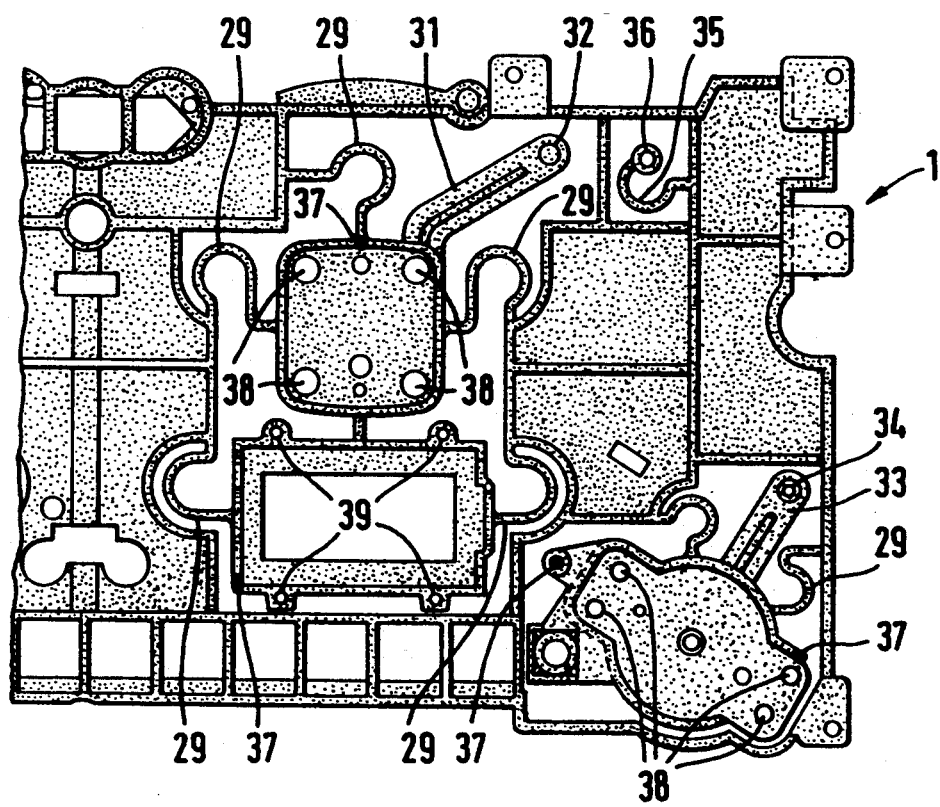
FIG. 15 is a partial showing in accordance with FIG. 13, with the system support equipped.
Figure 16:
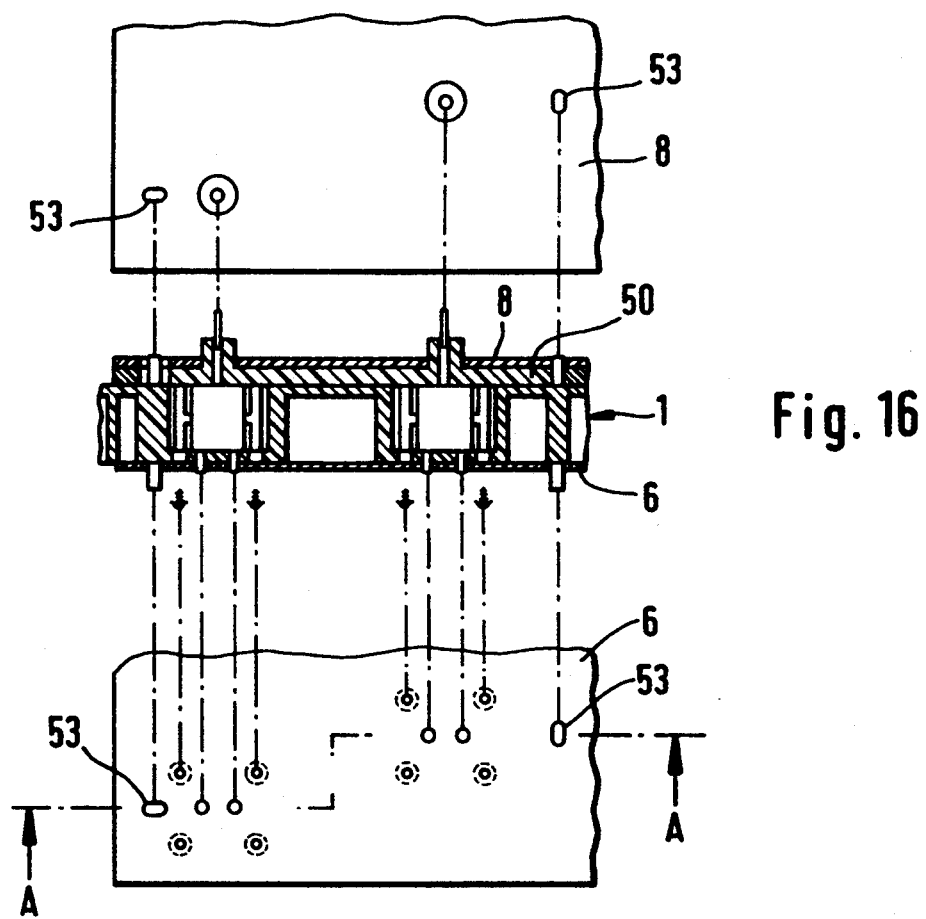
FIG. 16 is a modified embodiment of the combination instrument for transmitted-light illumination.
Figure 17:
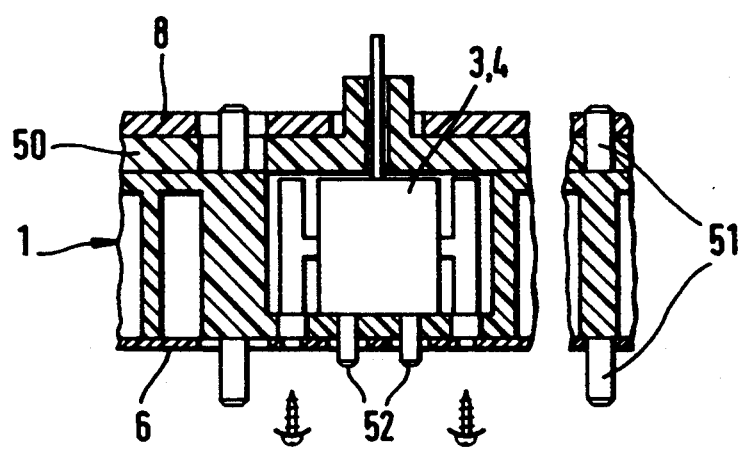
FIG. 17 is an enlarged showing of the combination instrument shown in section in FIG. 16.

In the embodiments described above, the system support 1 consists in particular of transparent material so that at the same time it assumes the function of a light guide. Transmitted-light illumination can be used also in the embodiment described in FIGS. 13 and 14, in which the light guide is a part separate from the system support, these two parts resting in sandwich-like manner on each other. The system support can then consist of non-transparent material, in particular non-transparent plastic. FIGS. 16 and 17 show the system support (PP) 1 with flexible circuit board 6 arranged on its rear as well as light guide 50 present on the side facing away from the circuit board 6, which light guide rests in sandwich-like manner on the system support 1 and is covered by the plastic dial 8. The circuit board 6 and the dial 8 are folded into the plane of the paper in order to show the positioning and fastening of the circuit board 6 and dial 8 to the system support 1. Guide pins on the system support are indicated by the numeral 51 and guide pins on the movement 2 and 4 by the numeral 52. The guide pins 51 on the system support 1 cooperate, as described above with respect to the other embodiments, with slots 53 arranged 90° apart in the circuit board 6 and the dial 8.

Figure 18:
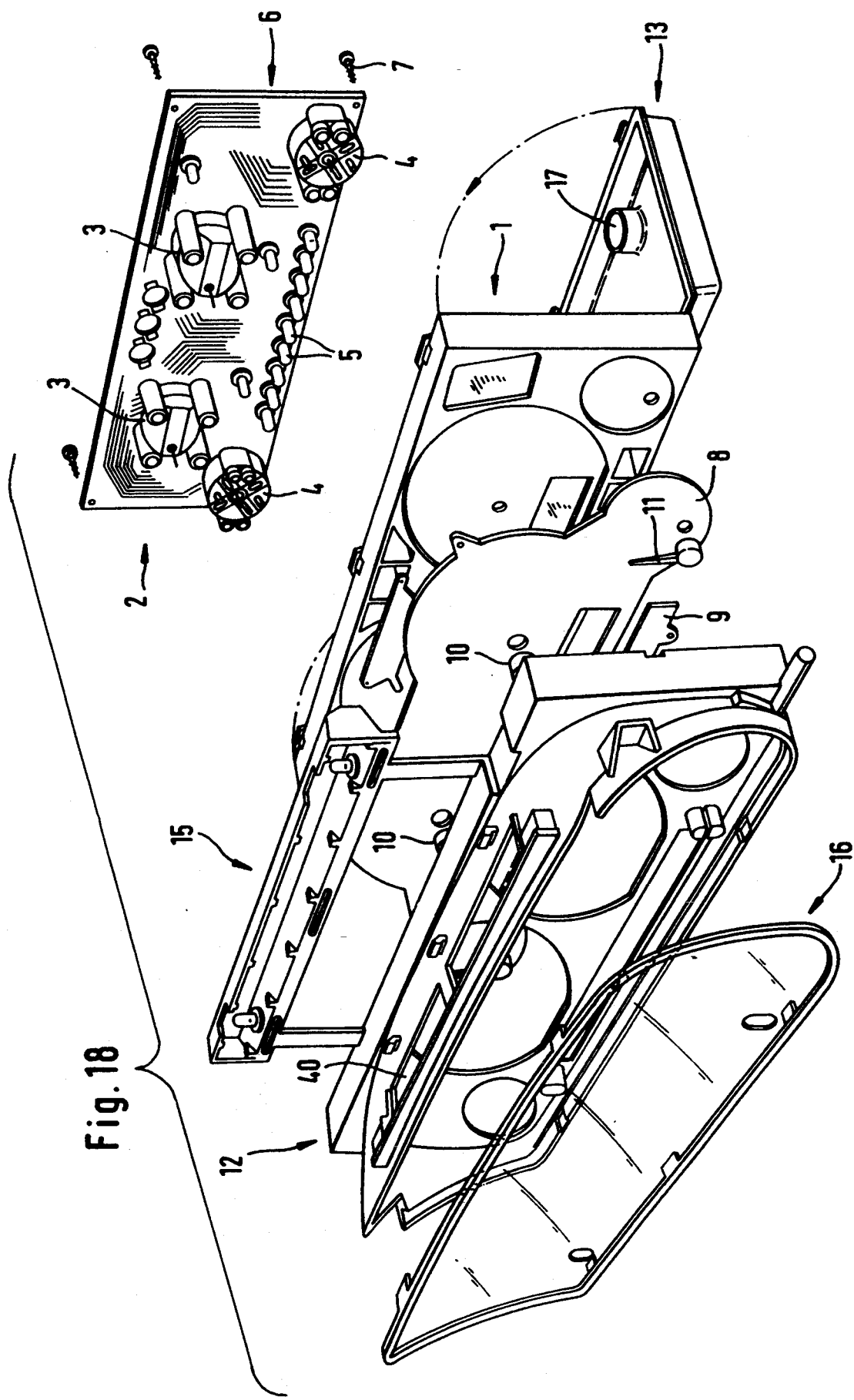
FIG. 18 is an exploded view of a combination instrument which is modified as compared with the showing in FIG. 1.

FIG. 18 shows a development of the combination instrument which is modified in principle insofar as in it the closure cover 13 is hinged by a film hinge (not shown) directly on the system support 1. The latter is connected directly to the front frame 12. Differing from the showing in FIG. 1, in the fundamental development according to FIG. 18, the light box 15 is shown in the position thereof not yet placed on the light shafts 40.

We claim:
1. A combination instrument comprising
   a frame with a front transparent cover and a rear closure cover;
   an assembly of display systems mounted in the frame, and a circuit board having electric components disposed behind the display systems assembly, the display systems assembly being located between the front cover and the circuit board, the display systems assembly contacting the circuit board; and a system support having recesses for positioning and holding the display systems assembly within the frame; and floating means for providing a floating attachment of the circuit board to the system support.

2. An instrument according to claim 1, wherein said display systems assembly includes operating elements for operation of the display systems.

3. An instrument according to claim 2, wherein there are plural recesses corresponding to the maximum number of display systems and operating elements.

4. An instrument according to claim 1,
wherein each of said display systems comprises a measuring mechanism with a pointer and a display unit.

5. An instrument according to claim 1, wherein the system support is provided on its rear with said recesses for securing components of said display systems assembly.

6. An instrument according to claim 1, wherein the system support is made of synthetic material and is a plastic part.

7. An instrument according to claim 6, wherein said plastic part is an injection molded part.

8. An instrument according to claim 1, wherein said floating means comprises pin and slot connections between the circuit board and the system support.

9. An instrument according to claim 1, wherein said contact of said display systems and said operating elements with said circuit board is in floating manner.

10. An instrument according to claim 1, wherein said circuit board and said display systems are mounted in said system support and are displaceable perpendicular to a lengthwise direction of the recesses.

11. An instrument according to claim 1, wherein said closure cover is mounted in the system support.

12. An instrument according to claim 1, wherein the closure cover is provided with cutouts.

13. An instrument according to claim 1, wherein the combination instrument is fastened, in the region of its center of gravity, to an instrument panel of a motor vehicle.

14. An instrument according to claim 1, wherein the combination instrument is fastened by means of said system support on an instrument panel of motor vehicle.

15. An instrument according to claim 1, wherein said closure cover is connected to said frame.

16. A combination instrument comprising:
a frame with a front transparent cover and a rear closure cover;
an assembly of display systems mounted in the frame, and a circuit board having electric components disposed behind the display systems assembly, the display systems assembly being located between the front cover and the circuit board, the display systems assembly contacting the circuit board;
a system support having recesses for positioning and holding the display systems assembly within the frame, the circuit board being attached to the system support;
wherein each of said display systems comprises a measuring mechanism with a pointer and a display unit which is a dial or symbol disk or a display component or a luminous display; and wherein for receiving said circuit board and for receiving a dial, said system support has pins which extend through slots in said circuit board and slots in said dial;

one of said slots is arranged in a central region of said circuit board, and said one of said slots and one of said slots which is in said dial extend in a widthwise direction respectively of said circuit board and of said dial; and at least one of said slots is arranged outside the central region, and is disposed in a longitudinal direction in each of said circuit board and said dial.

17. An instrument according to claim 16, wherein
two of said slots extend in the longitudinal direction of said circuit board and of said dial, and are arranged in a region of two narrow sides of said circuit board and said dial.

18. An instrument according to claim 16, wherein
an attachment of said circuit board and of said dial is effected via screws or rivets which pass through the slots of said circuit board and said dial.

19. An instrument according to claim 18, wherein
there is a fastening of individual ones of said circuit board, said dial, said display systems and said operating elements on said circuit board by additional slots which are provided in said circuit board and said dial;

there is a longitudinal direction of the slots arising from a zero point of said circuit board and said dial to the center of a corresponding slot, the zero point or intersection of the longitudinal axis of the slots being used for positioning of the components.

20. An instrument according to claim 19, wherein
the zero point is the center of a slot oriented in transverse direction parallel to said circuit board and in a central region of said circuit board.

21. An instrument according to claim 20, wherein
said system support has a base plate; and
displaceable display systems are held in recesses in the base plate of the system support via webs, said webs being resilient perpendicular to the lengthwise direction of the recesses.

22. A combination instrument comprising:
a frame with a front transparent cover and a rear closure cover;
an assembly of display systems mounted in the frame, and a circuit board having electric components disposed behind the display systems assembly, the display systems assembly being located between the front cover and the circuit board, the display systems assembly contacting the circuit board;
a system support having recesses for positioning and holding the display systems assembly within the frame, the circuit board being attached to the system support;
wherein the system support is provided on its rear with said recesses for securing components of said display systems assembly; and
said recesses are shafts which serve to stiffen said system support.

23. A combination instrument comprising:
a frame with a front transparent cover and a rear closure cover;
an assembly of display systems mounted in the frame, and a circuit board having electric components disposed behind the display systems assembly, the display systems assembly being located between the front cover and the circuit board, the display systems assembly contacting the circuit board;

a system support having recesses for positioning and holding the display systems assembly within the frame, the circuit board being attached to the system support;

wherein said display systems assembly includes operating elements for operation of the display systems; and said recesses have cross sections which match dimensions of the display systems and the operating elements respectively associated with them.

24. A combination instrument comprising:

a frame with a front transparent cover and a rear closure cover;

an assembly of display systems mounted in the frame, and a circuit board having electric components disposed behind the display system assembly, the display systems assembly being located between the front cover and the circuit board, the display systems assembly contacting the circuit board;

a system support having recesses for positioning and holding the display systems assembly within the frame, the circuit board being attached to the system support;

wherein said system support extends over the entire visible surface of the combination instrument.

25. A combination instrument comprising:

a frame with a front transparent cover and a rear closure cover;

an assembly of display systems mounted in the frame, and a circuit board having electric components disposed behind the display systems assembly, the display systems assembly being located between the front cover and the circuit board, the display systems assembly contacting the circuit board;

a system support having recesses for positioning and holding the display systems assembly within the frame, the circuit board being attached to the system support;

wherein said display systems assembly includes operating elements for operation of the display systems; and said floating means employs bolts or screws to prevent movement of the components in a direction perpendicular to the system support.

26. A combination instrument comprising:

a frame with a front transparent cover and a rear closure cover;

an assembly of display systems mounted in the frame, and a circuit board having electric components disposed behind the display systems assembly, the display systems assembly being located between the front cover and the circuit board, the display systems assembly contacting the circuit board;

a system support having recesses for positioning and holding the display systems assembly within the frame, the circuit board being attached to the system support;

wherein said display systems assembly includes operating elements for operation of the display systems; and said display systems assembly and said operating elements are mounted in said system support so as to be non-displaceable perpendicular to a lengthwise direction of said recesses, and said circuit board is mounted displaceably in a plane of the circuit board relative to said system support.

27. A combination instrument comprising:

a frame with a front transparent cover and a rear closure cover;

an assembly of display systems mounted in the frame, and a circuit board having electric components disposed behind the display systems assembly, the display systems assembly being located between the front cover and the circuit board, the display systems assembly contacting the circuit board;

a system support having recesses for positioning and holding the display systems assembly within the frame, the circuit board being attached to the system support;

wherein the system support is provided on its rear with said recesses for securing components of said display systems assembly; and said recesses are developed by ribs which serve to stiffen said system support.

28. A combination instrument comprising:

a frame with a front transparent cover and a rear closure cover;

an assembly of display systems mounted in the frame, and a circuit board having electric components disposed behind the display systems assembly, the display systems assembly being located between the front cover and the circuit board, the display systems assembly contacting the circuit board;

a system support having recesses for positioning and holding the display systems assembly within the frame, the circuit board being attached to the system support;

the system support is made of synthetic material and is formed as a plastic part; and said frame is a front frame, said rear closure cover being developed as a non-supporting part which is positioned and held in the system support.

29. A combination instrument according to claim 28, wherein said plastic part is an injection molded part.

30. A combination instrument comprising:

a frame with a front transparent cover and a rear closure cover;

an assembly of display systems mounted in the frame, and a circuit board having electric components disposed behind the display systems assembly, the display systems assembly being located between the front cover and the circuit board, the display system assembly contacting the circuit board;

a system support having recesses for positioning and holding the display systems assembly within the frame, the circuit board being attached to the system support;

wherein the system support is provided on its rear with said recesses for securing components of said display systems assembly; and said recesses are ribs which serve to stiffen said system support.

31. A combination instrument comprising:

a frame with a front transparent cover and a rear closure cover;

an assembly of display systems mounted in the frame, and a circuit board having electric components disposed behind the display system assembly, the display systems assembly being located between the front cover and the circuit board, the display systems assembly contacting the circuit board;

a system support having recesses for positioning and holding the display systems assembly within the frame, the circuit board being attached to the system support;

wherein the system support is provided on its rear with said recesses for securing components of said display systems assembly; and said recesses are honeycombs which serve to stiffen said system support.

32. A combination instrument comprising:

a frame with a front transparent cover and a rear closure cover;

an assembly of display systems mounted in the frame, and a circuit board having electric components disposed behind the display systems assembly, the display systems assembly being located between the front cover and the circuit board, the display systems assembly contacting the circuit board;

a system support having recesses for positioning and holding the display systems assembly within the frame, the circuit board being attached to the system support;

wherein the system support is provided on its rear with said recesses for securing components of said display systems assembly; and said recesses are developed by honeycombs which serve to stiffen said system support.

33. A combination instrument comprising:

a frame with a front transparent cover and a rear closure cover;

an assembly of display systems mounted in the frame, and a circuit board having electric components disposed behind the display systems assembly, the display systems assembly being located between the front cover and the circuit board, the display systems assembly contacting the circuit board;

a system support having recesses for positioning and holding the display systems assembly within the frame, the circuit board being attached to the system support;

wherein the system support is made of synthetic material and is formed as a plastic part; and said frame is a front frame, said frame being developed as a non-supporting part which is positioned and held in the system support.

34. An instrument according to claim 33, wherein said plastic part is an injection molded part.

* * * * *